Figure 1:
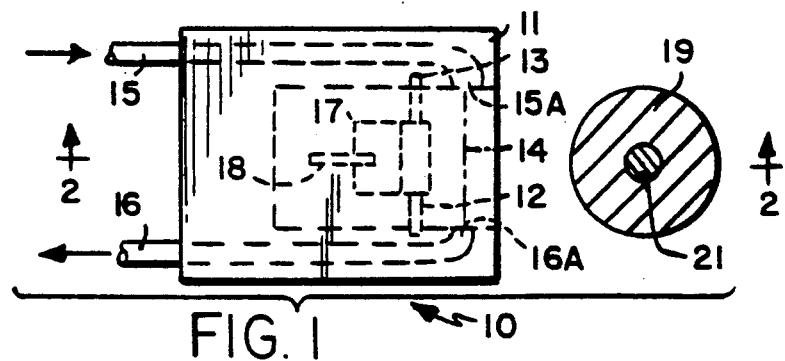

United States Patent [19]

Norcross, Jr.

[11] Patent Number: 5,179,602
[45] Date of Patent: Jan. 12, 1993

[54] MAGNETICALLY OPERATED FIBER OPTIC SWITCH FOR CONTROLLING LIGHT TRANSMISSION

[75] Inventor: Robert A. Norcross, Jr., Newton, Mass.

[73] Assignee: Norcross Corporation, Newton, Mass.

[21] Appl. No.: 724,752

[22] Filed: Jul. 2, 1991

[51] Int. Cl.⁵ .............................................. G02B 6/26
[52] U.S. Cl. ...................................... 385/19; 200/47; 335/205; 385/25
[58] Field of Search .................. 350/96.15, 96.2, 96.21; 335/205, 207; 200/19 M, 47, 61.02, 404; 385/16, 18, 19, 22, 23, 25

[56] References Cited

U.S. PATENT DOCUMENTS

| | | | |
|---|---|---|---|
| 3,678,425 | 7/1972 | Holmes, Jr. | 335/207 |
| 4,082,435 | 4/1978 | Zeitz | 350/269 |
| 4,596,442 | 6/1986 | Anderson et al. | 350/96.2 |
| 4,610,504 | 9/1986 | Thurenius et al. | 350/96.2 |
| 4,796,966 | 1/1989 | Kovaleski et al. | 385/16 X |
| 4,836,632 | 6/1989 | Bardoorian | 385/25 X |

FOREIGN PATENT DOCUMENTS

WO90/04803 5/1990 PCT Int'l Appl. .
2119538A 11/1983 United Kingdom .

Primary Examiner—John D. Lee
Attorney, Agent, or Firm—Robert F. O'Connell

[57] ABSTRACT

A switching device which uses a pivotable switching element carrying a first magnet and a movable component carrying a second magnet mounted adjacent thereto, the north and south poles of the magnets being arranged so that, when the movable component is moved to a first location, the magnets attract and the pivotable element is in a first switch position and, when the movable component is moved to a second location, the magnets repel and the pivotable element is in a second switch position.

7 Claims, 1 Drawing Sheet

MAGNETICALLY OPERATED FIBER OPTIC SWITCH FOR CONTROLLING LIGHT TRANSMISSION

INTRODUCTION

This invention relates generally to switching devices and, more particularly, to a switching device for use in interrupting in an on/off fashion the transmission of a beam of light in a fiber optic light transmission system, which device requires no electrical circuitry and can be used safely in a hazardous environment.

BACKGROUND OF THE INVENTION

In many applications it is desirable to interrupt the transmission of light, as in a system using fiber optic light transmission. Often such applications use an electrically controlled switch for moving a light blocking element into and out of a light beam transmission path, such switch requiring the applying of a voltage for generating a current to actuate the switch element. In many applications, however, where the switch may be used in a hazardous environment, the presence of electrical voltages and currents may be dangerous, since the possibility exists for the generation of an electrical spark or of generating excessive heat, e.g., where an electrical short circuit may arise, which might cause a fire or even an explosion in the hazardous environment.

It is desirable to design a switching device which requires no electrical voltage or current to be applied to the switching element. It is further helpful in many applications to provide a switching element which can be operated effectively in an environment in which vibrations are likely to occur.

BRIEF SUMMARY OF THE INVENTION

In accordance with the invention, a switching arm element has a magnet positioned thereon, the switching element being pivotally mounted so as to rotate about an axis so that a portion thereof, preferably at or near the end of the element, can be moved into and away from the path along which light is being transmitted, as in a fiber optic circuit. In that way, the light transmission can be interrupted or not as the element moves it into and out of the path. A movable means mounted is separately from and adjacent to the switching element. The movable means, such as a linearly moving rod, has a magnet positioned thereon which magnet moves in a substantially perpendicular manner relative to the position of the magnet on the switching arm element.

Accordingly, as the magnet of the movable means moves in one direction or another past the magnet of the pivotable arm element, the latter is actuated so as to move into or away from the light transmitting path so as to close or open the path for the light being transmitted therealong.

DESCRIPTION OF THE INVENTION

Figure 2:
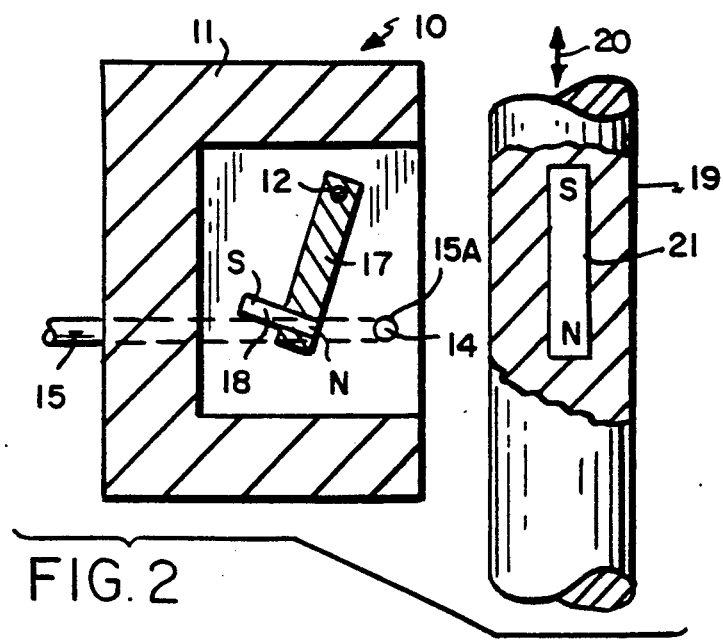
Figure 3:
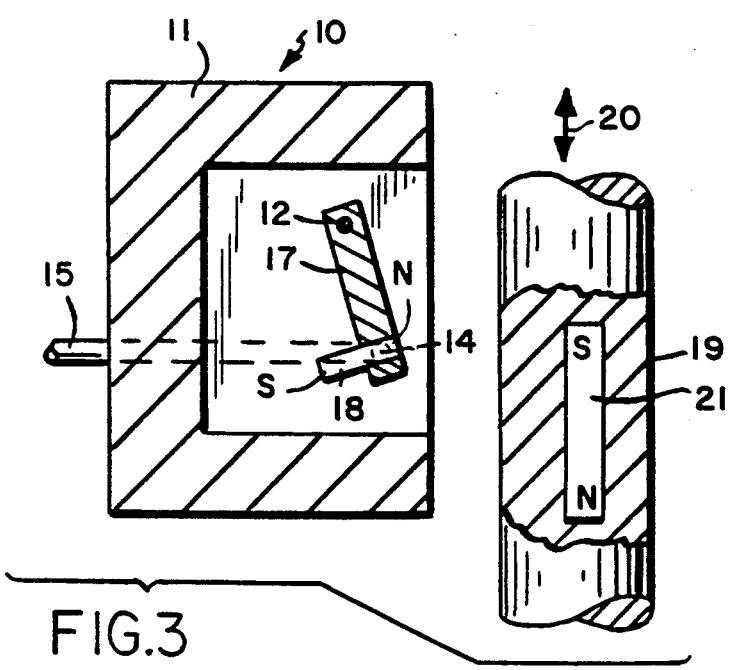

The invention can be described in more detail with the help of the drawings wherein FIG. 1 shows a plan view representing a particular embodiment of a switching device in accordance with the invention;

FIG. 2 shows a diagrammatic side view along the line 2—2 of the embodiment of FIG. 1 with the switching arm element thereof in one of its switching positions; and FIG. 3 a diagrammatic side view along the line 2—2 of the embodiment of FIGS. 1 and 2 with the switching arm element thereof in the other of its switching positions.

The diagrammatic illustrations depicted in FIGS. 1-3 demonstrate the structure and operation of an exemplary switching device structure, in accordance with the invention. As can be seen therein, a switching element 10 is mounted in a housing 11 so as to pivot at a point 12 about an axis 13. In the particular embodiment shown, a light beam is transmitted along a path 14 between a pair of fiber optic cables 15 and 16 from an output end 15A of cable 15 to an input end 16A of cable 16, for example.

Switching element 10 includes a pivotable arm 17 which pivots at point 12 and has attached near one end thereof a magnet 18 projecting essentially perpendicularly therefrom as shown. A movable means, such as a piston rod 19, is mounted adjacent housing 11 so as to move preferably along a linear path relative to housing 11 in the directions shown by arrow 20. A magnet 21 is affixed to rod 19, preferably being embedded within rod 19 along the axis of the rod so as to move in the same direction therewith. Magnet 21 is positioned within rod 19 so as to be generally perpendicular to magnet 18 of switching element 10 as pivotable arm 17 moves from one position to another. Magnets 18 and 21 are arranged so that their north (N) and south (S) poles have the specific positions depicted relative to each other. In the particular embodiment depicted, the magnet and the rod have cylindrical shapes, although other shapes may be used, if desired.

When rod 19 is in the position shown in FIG. 2, the north poles of magnets 18 and 21 repel each other and switch element 10 is in a position out of the path 14 so that light can be transmitted along the path between cables 15 and 16. When rod 19 moves to the position shown in FIG. 3, the north pole of magnet 18 is attracted to the south pole of magnet 21 so that arm 17 is caused to pivot to the position shown in FIG. 3 to interrupt and block out the transmission of light along path 14. When rod 19 moves again to the position shown in FIG. 2, the switch element is then caused to pivot to the position shown in FIG. 1 to open up the light transmitting path 14.

Thus, pivot arm 12 moves between its non-blocking (open) position and its blocking (closed) position due to the repelling and attracting magnetic forces, respectively, created between magnets 18 and 21. The pivot arm 17 can be relatively light in weight and magnets used and the forces created thereby can be relatively small so that substantially little force is required for appropriate actuation of the switch arm 17.

Further, since the switch positions in the open or closed states are maintained by the operation of such magnetic forces, the switch operation is more reliable than non-electric devices which rely upon gravity for moving a switch element from one of its positions to another. Moreover, the use of magnetic forces to maintain the switch in its open or closed states permits the switch to be used to provide effective operation even when the housing may be subject to some vibrations or other movements. Since actuation of the switch depends only on magnetic forces, no electrical voltages or currents need be used in the system and the switch can be used in a hazardous environment where the presence of an electrical spark or of excessive heat generation could cause a fire or an explosion.

While the switching device of the invention is shown as used to directly open or block the transmission of light along a path, the device can also be used in other applications. For example, the switching element may include a reflecting surface and may be moved so as to cause light either to be transmitted along a path in one state or to be reflected back along the same path or along a different path in another state. Other uses or modifications of the invention may occur to one in the art within the spirit and scope of the invention. Hence, the invention is not to be construed as limited to the particular embodiment or application thereof described above, except as defined by the appended claims.

What is claimed is:

1. A switching device comprising
    a pivotable switching means mounted so as to pivot about one end thereof between a first switch position and a second switch position;
    a first magnet mounted at or near another end of said pivotable switching means opposite to said one end;
    movable means mounted adjacent said pivotable switching means for movement along a path adjacent said pivotable switching means;
    a second magnet affixed to said movable means so as to move in a direction substantially along the path of movement of said movable means and generally perpendicularly to said first magnet;
    said magnets being arranged so that the north and south poles thereof produce an attractive force between them when said movable means is moved to a first location so as to cause said pivotable switching means to pivot to its first position and produce a repelling force between them when said movable means is moved to a second location so as to cause said pivotable switching means to pivot to its second position.

2. A switching device in accordance with claim 1 wherein said movable means is mounted for substantially linear movement along said path.

3. A switching device in accordance with claim 2 wherein said path is substantially parallel to said pivotable switching means.

4. A switching device in accordance with claim 1 for use in interrupting light traveling in a transmission path wherein said transmission path is blocked so as to prevent said light from traveling therein when said pivotable switching means is in its first position and wherein said transmission path is open so as to permit said light to travel therein when said pivotable switching means is in its second position.

5. A switching device in accordance with claim 4 where said light is supplied to one end of said transmission path from a fiber optic cable and is received at the other end of said transmission path by a fiber optic cable.

6. A switching device in accordance with claim 1 wherein said second magnet is embedded in said movable means along the axis of said movable means.

7. A switching device in accordance with claim 6 wherein said second magnet and said movable means have cylindrical shapes.

* * * * *